US008739667B2

(12) United States Patent
Dijon et al.

(10) Patent No.: US 8,739,667 B2
(45) Date of Patent: Jun. 3, 2014

(54) ROTARY CUTTING APPARATUS WITH VIBRATION ATTENUATION MEANS

(75) Inventors: Pierre-Luc Dijon, Aubrives sur Vareze (FR); Arnaud Pras, Jarcieu (FR)

(73) Assignee: Sandvik Intellectual Property AB, Sandviken (SE)

( * ) Notice: Subject to any disclaimer, the term of this patent is extended or adjusted under 35 U.S.C. 154(b) by 284 days.

(21) Appl. No.: 13/431,167

(22) Filed: Mar. 27, 2012

(65) Prior Publication Data

US 2012/0255411 A1 Oct. 11, 2012

(30) Foreign Application Priority Data

Apr. 8, 2011 (SE) ....................................... 1150312

(51) Int. Cl.
*B23D 25/12* (2006.01)

(52) U.S. Cl.
USPC ............................................... 83/343; 83/564

(58) Field of Classification Search
USPC .................................... 83/564, 658, 659, 343
See application file for complete search history.

(56) References Cited

U.S. PATENT DOCUMENTS

| | | | | |
|---|---|---|---|---|
| 661,470 | A * | 11/1900 | Fawell | 72/239 |
| 5,048,387 | A * | 9/1991 | Niitsuma et al. | 83/344 |
| 5,176,610 | A * | 1/1993 | Gietman, Jr. | 493/194 |
| 7,299,729 | B2 * | 11/2007 | Cox | 83/343 |
| 2001/0001376 | A1 * | 5/2001 | Kneppe et al. | 83/663 |
| 2001/0029812 | A1 * | 10/2001 | Kirkpatrick et al. | 76/115 |
| 2002/0174753 | A1 * | 11/2002 | Cox | 83/13 |
| 2006/0257193 | A1 | 11/2006 | Aichele et al. | |
| 2012/0255411 | A1 * | 10/2012 | Dijon et al. | 83/344 |
| 2012/0255412 | A1 * | 10/2012 | Dijon et al. | 83/344 |
| 2014/0041493 | A1 * | 2/2014 | Dulaney | 83/13 |

FOREIGN PATENT DOCUMENTS

| | | |
|---|---|---|
| EP | 1 612 010 | 1/2006 |
| EP | 1 710 058 | 10/2006 |
| EP | 1 721 712 | 11/2006 |
| WO | 03/093696 | 11/2003 |

OTHER PUBLICATIONS

Eurpoean Search Report for Application No. 12160764.2 dated Jul. 16, 2012.

* cited by examiner

*Primary Examiner* — Sean Michalski
(74) *Attorney, Agent, or Firm* — Morgan, Lewis & Bockius LLP

(57) ABSTRACT

Rotary cutting apparatus has a frame, a first rotary device and a second rotary device. Each of the first and second rotary devices has a shaft concentrically arranged about a rotational axis and a drum and are arranged in the frame in such a way that said first and second axes are substantially horizontal and substantially in the same vertical plane. A pair of bearing housings is arranged on either side of each of the drums. A first pair of bearing housings is movable relative to the frame in a transverse direction to the first rotational axis by means of a force means. Means is provided for passive vibration attenuation of at least the first shaft, the means being able to reduce vibrations due to impacts of the first drum in relation to the second drum.

7 Claims, 10 Drawing Sheets

ROTARY CUTTING APPARATUS WITH VIBRATION ATTENUATION MEANS

RELATED APPLICATIONS

This application is based on and claims priority under 37 U.S.C. §119 to Swedish Application No. 1150312-5, filed 8 Apr. 2011, the entire contents of which are incorporated herein by reference.

FIELD OF THE DISCLOSURE

The present invention relates to a rotary cutting apparatus, comprising

- a frame;
- a first rotary device, such as a rotary cutter or a rotary anvil comprising a first shaft concentrically arranged about a first rotational axis and a first drum, such as an anvil drum or a cutter drum concentrically arranged on said first shaft, said first shaft being provided with a first pair of bearing housings arranged on either sides of said first drum;
- a second rotary device comprising a second shaft concentrically arranged about a second rotational axis, and a second drum, such as an anvil drum or a cutter drum concentrically arranged on said shaft, said second shaft being provided with a second pair of bearing housings arranged on either sides of said second drum;
- said first and second rotary devices being arranged in said frame in such a way that said first and second axes are substantially horizontal and substantially in the same vertical plane;
- said second shaft being connected to the frame via said second pair of bearing housings;
- said first shaft being associated with said frame via said first pair of bearing housing, said first pair of bearing housings being movable relative to said frame in a transverse direction to said first rotational axis by means of a force means.

TECHNICAL BACKGROUND OF THE INVENTION

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

A rotary cutting apparatus is known from EP-A-1 710 058. The known rotary cutting apparatus however suffers from the drawback that it is not adapted for high speed cutting.

EP-A-1 721 712 discloses a rotary cutting apparatus provided with a controllable lifting device for actively lifting the anvil in response to a sensor for sensing protection of the anvil and the cutter against foreign bodies.

EP-A-1 612 010 discloses an anvil drum and the cutter drum for a rotary cutting apparatus, the anvil drum and/or the cutter drum being divided into a peripheral sleeve and and an intermediate sleeve, the material of the latter being chosen depending on the desired properties, such as vibration damping, thermal insulation, thermal conduction, weight reduction or weight increase.

WO 03/093696 discloses a mass damper for a machine tool intended for turning or milling.

SUMMARY OF THE INVENTION

An object of the present invention is to improve the stability of the first and the second arbours of the rotary cutting apparatus.

This has been achieved by a rotary cutting apparatus as initially defined, wherein means is provided for passive vibration attenuation of at least said first shaft, said means being able to reduce vibrations due to impacts of the first drum in relation to said second drum.

Hereby is achieved that the anvil drum and the cutter drum are better protected from impacts. Furthermore, due the rotary cutting apparatus can be used at higher speeds.

Preferably, said first pair of bearing housings are connected to an intermediate piece slidingly arranged in relation to said frame via at least one guide member, wherein said force means comprises a pneumatic cylinder for pressing the first drum via said intermediate piece towards said second drum such that they come into a cutting relationship with one another, and at least one spring means for applying a force counter directed to that of the pneumatic cylinder, said means for vibration attenuation comprising at least one elastomeric member. Hereby is achieved a controlled movement of the first drum in relation to said second drum.

Suitably, said spring means is a helical spring and said said elastomeric member is hollow, said elastomeric member being arranged substantially coaxially to said helical spring. Hereby, a compact design is achieved.

Preferably, said frame is provided with a part having a substantial C-shaped cross-section on either sides of said first shaft, said part having an upper shank and a lower shank interconnected via an interconnecting portion, said guide member being arranged between said upper shank and said lower shank, said elastomeric member and said helical spring member being arranged substantially coaxially to said guide member. Hereby is achieved a controlled movement of the first drum in relation to said second drum as well as a compact design.

Preferably, said elastomeric member has a circular cross-section. Hereby, the shape of the elastomeric member is optimal in relation to said helical spring.

Suitably, said first rotary device comprises a rotary anvil and in that said second rotary device comprises a rotary cutter.

DRAWING SUMMARY

In the following, preferred embodiments of the invention will be described in further detail with reference to the accompanying drawings, in which.

Figure 4:
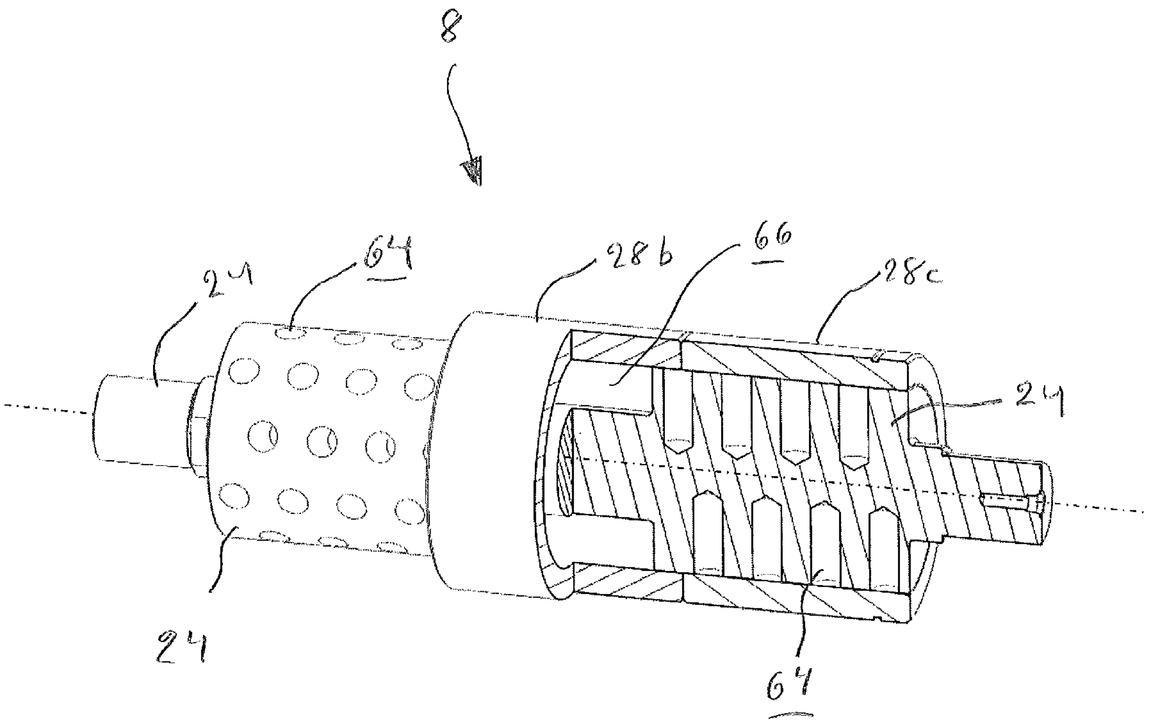
FIG. 4 is an anvil drum as shown in FIGS. 1A-1C and FIGS. 2-3, partly with details omitted, partly in cross-section.
Figure 5:
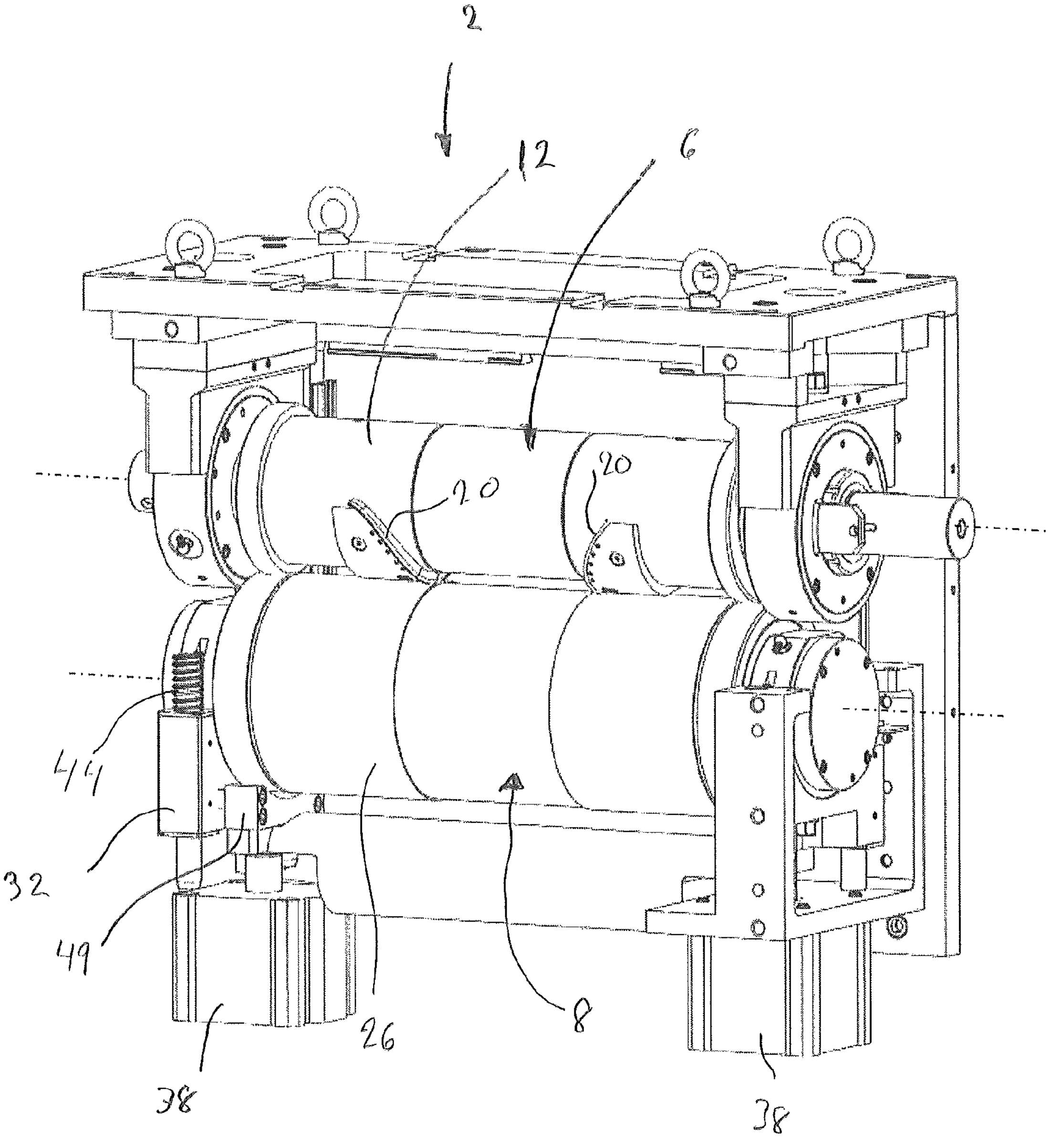
FIG. 5 is a front perspective view of a rotary cutting apparatus according to a further aspect of the invention.
Figure 6A:
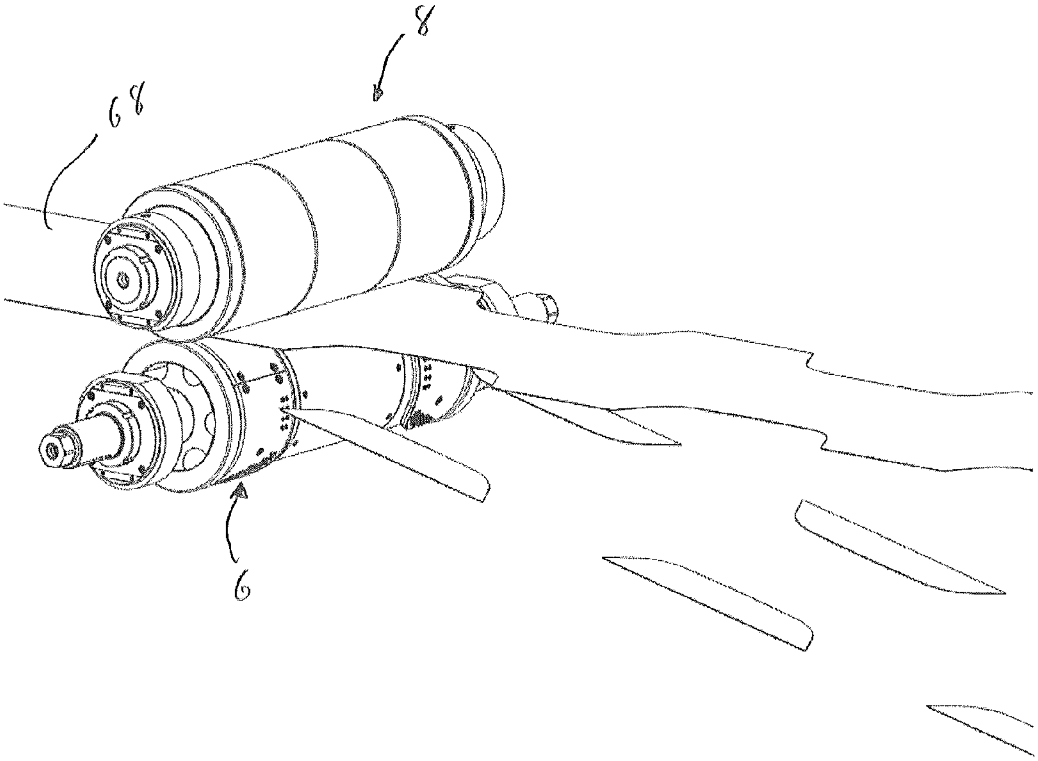
Figure 6B:
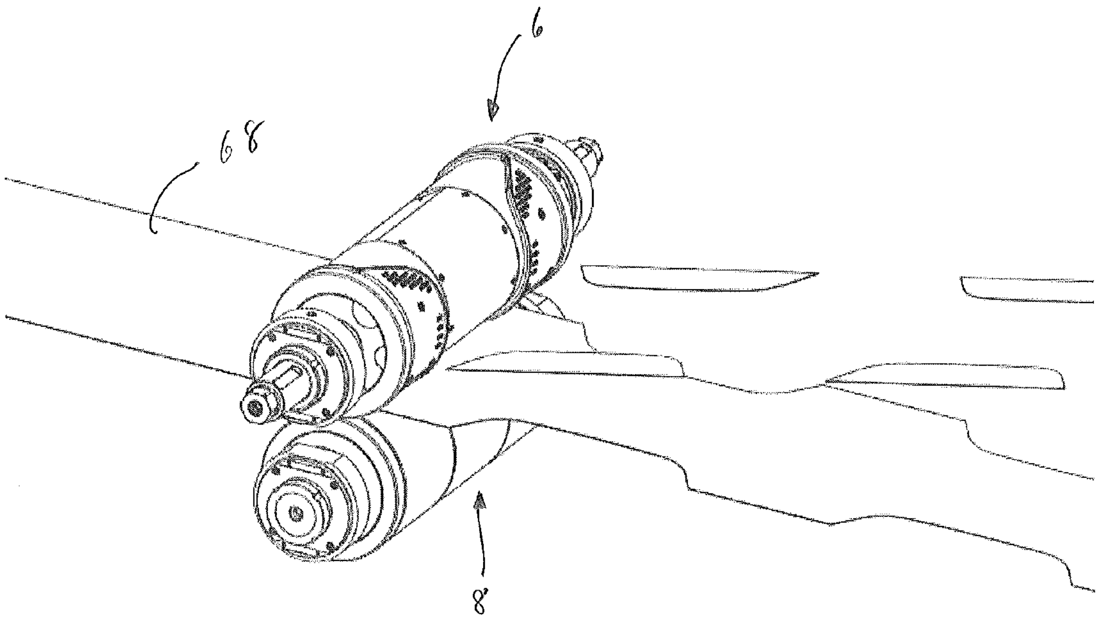

FIGS. 6*a* and 6*b* is a schematic view of a web cut to articles by the cutting apparatus shown in FIGS. 1 to 5.

Figure 1A:
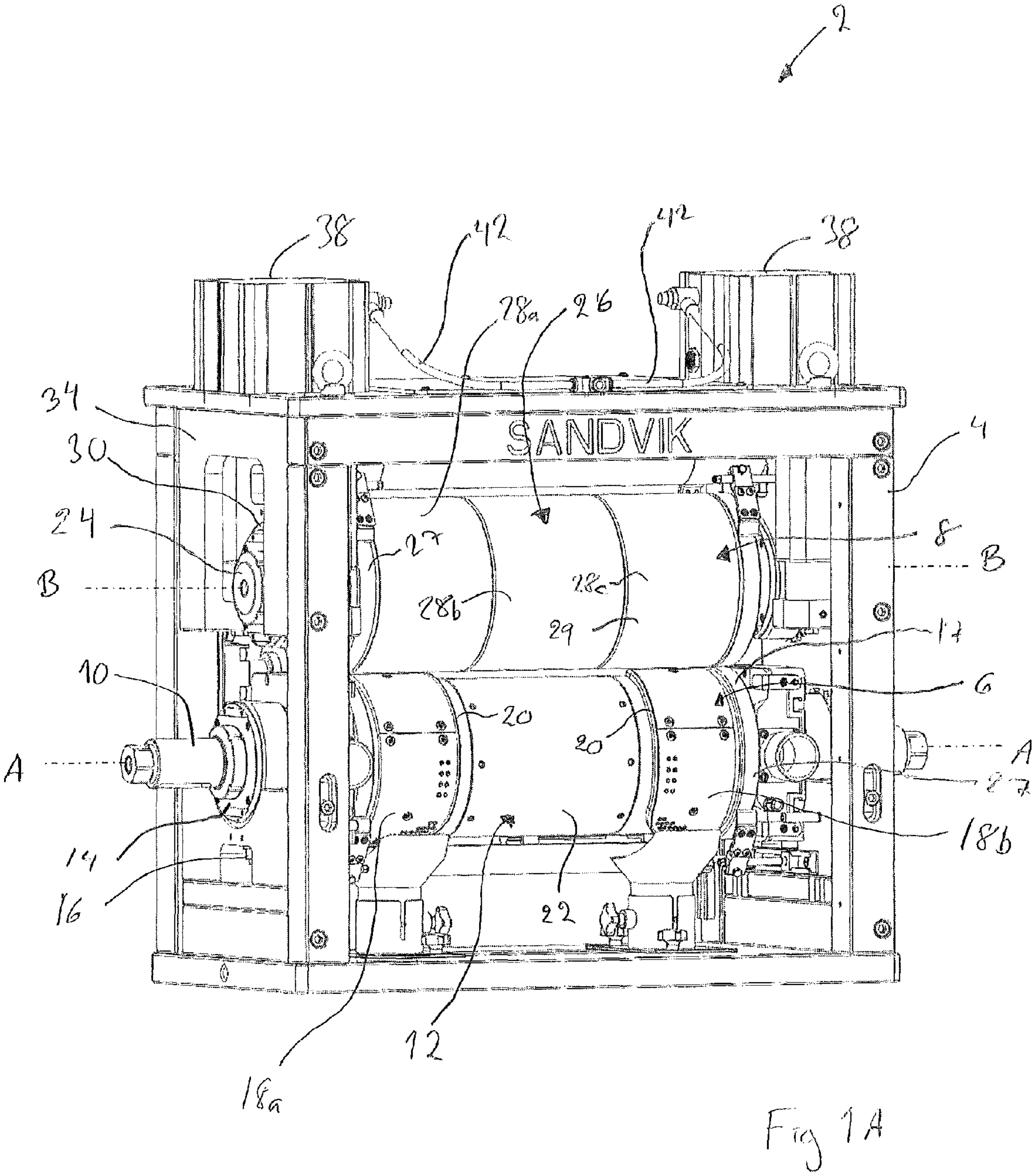
FIG. 1A is a front perspective view of a rotary cutting apparatus according to a first embodiment of the invention having cutter drum and an anvil drum.
Figure 1B:
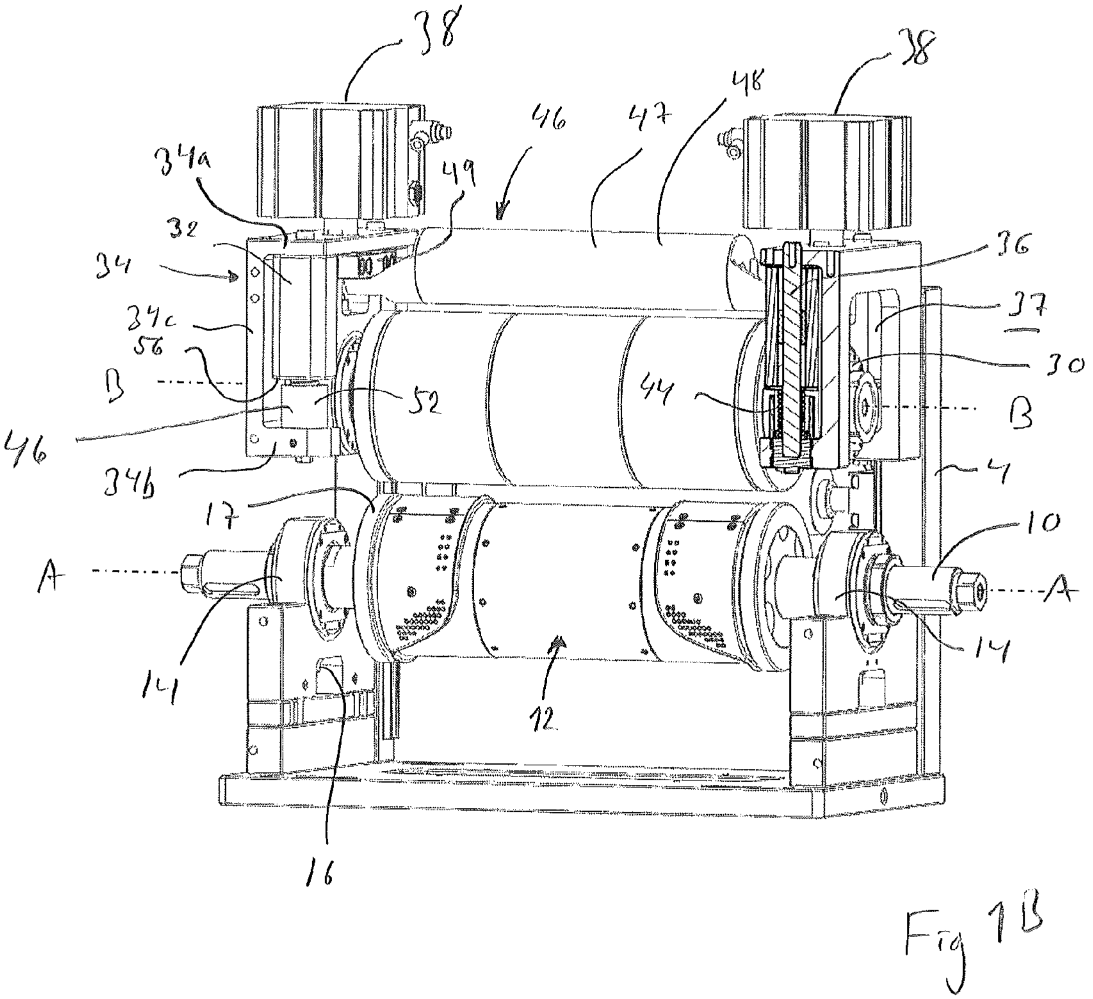
FIG. 1B is a front perspective view of the rotary cutting apparatus shown in FIG. 1A, including a mass damper, parts of the frame being omitted.
Figure 2:
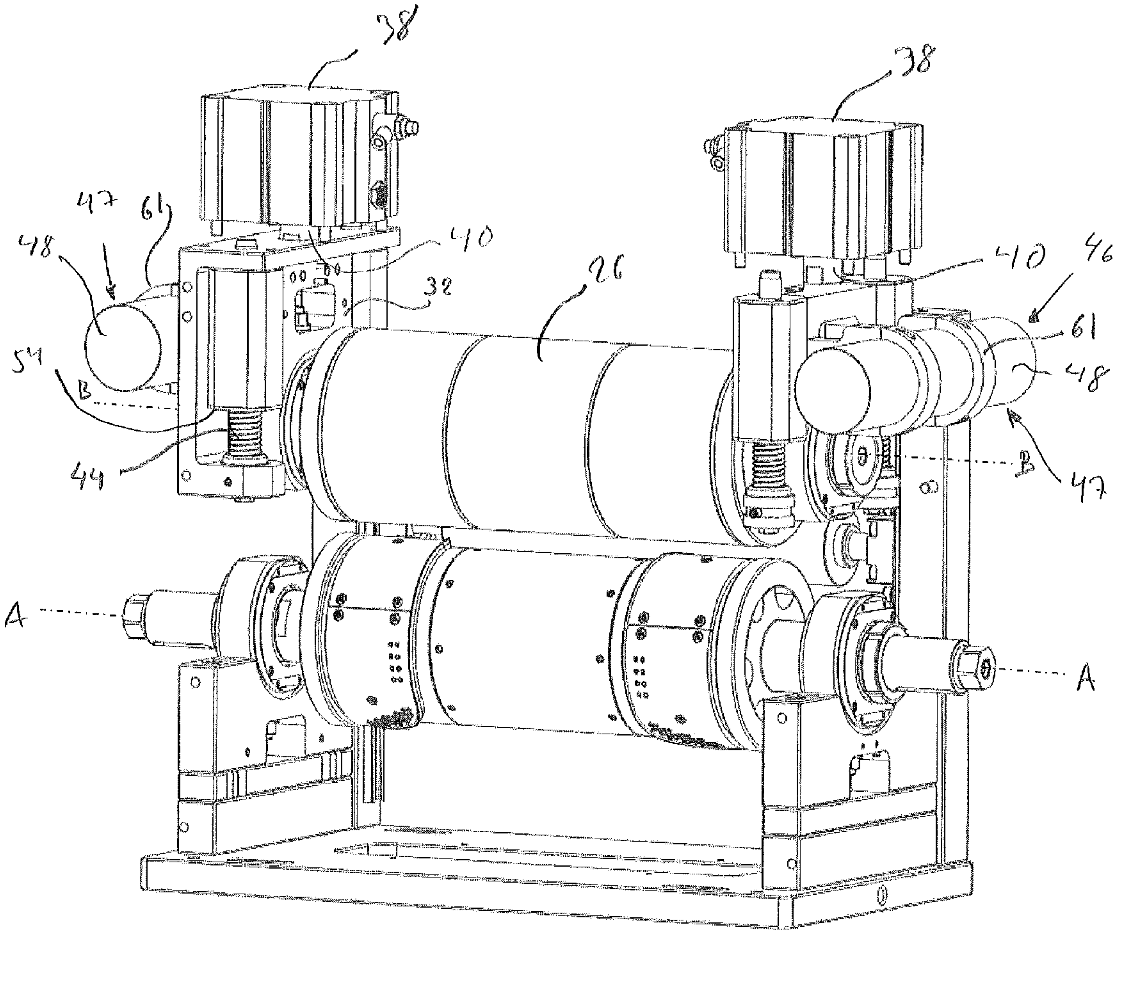
FIG. 2 is a front perspective view of a rotary cutting apparatus according to an alternative aspect of the invention including a mass damper.
Figure 7:
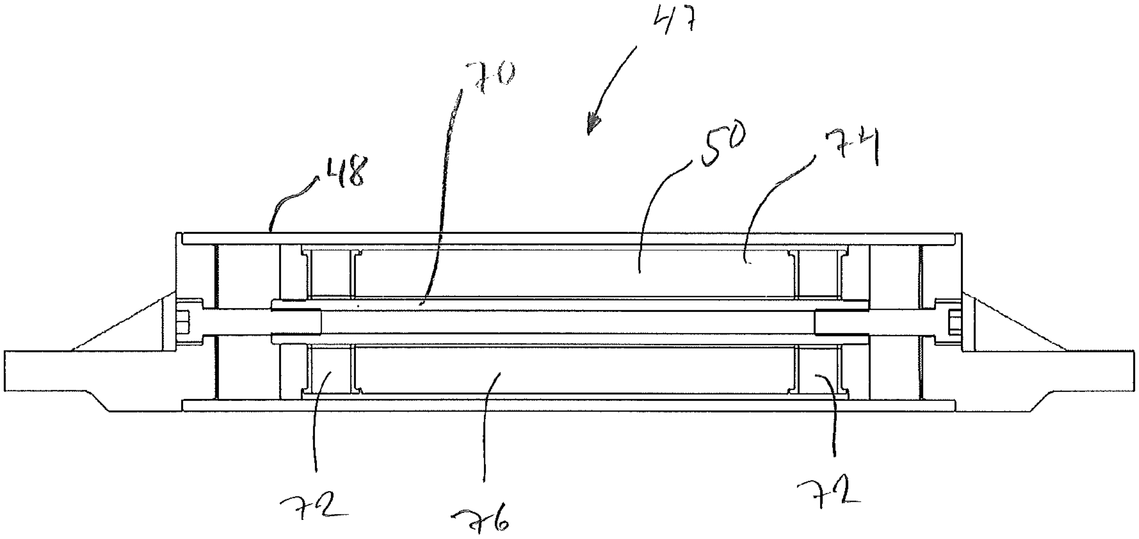

FIG. 7 illustrates schematically the principle of the mass damper shown in FIGS. 1B and 2.

DETAILED DESCRIPTION OF PREFERRED EMBODIMENTS

Figure 1C:
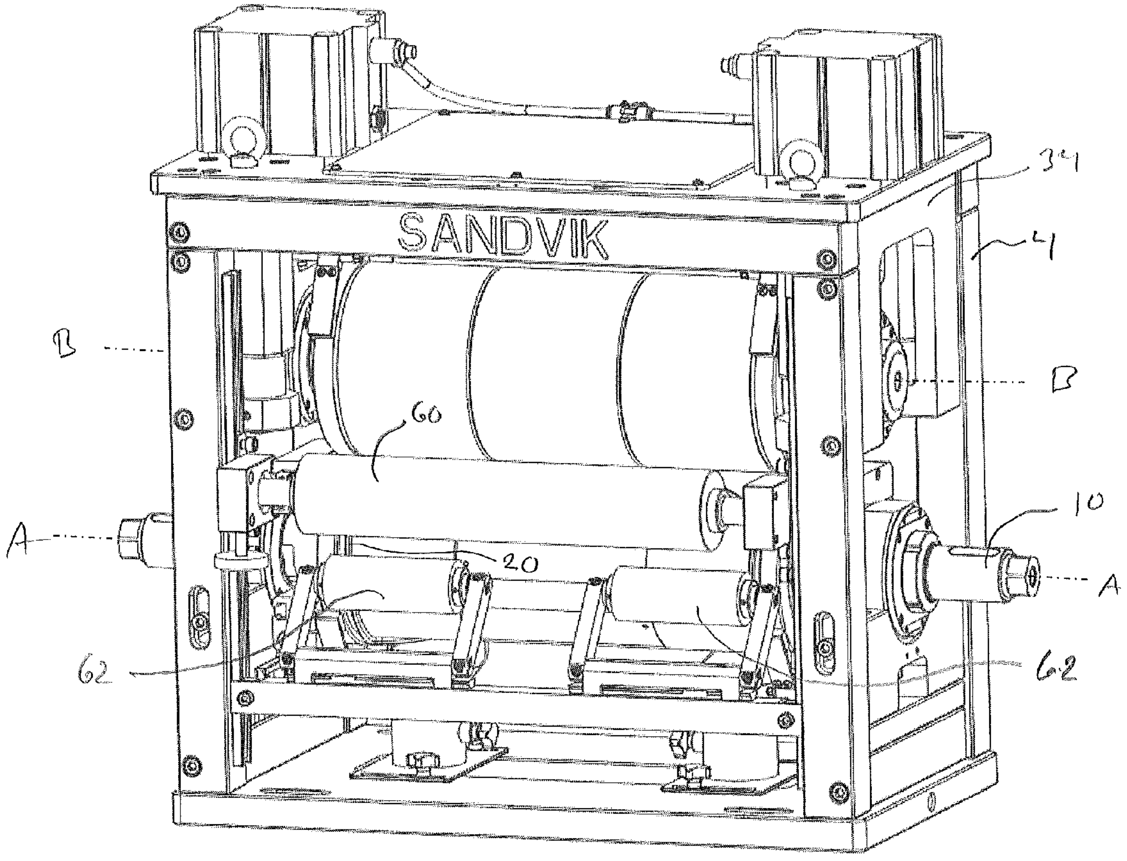
FIG. 1C is a rear perspective view of the rotary cutting apparatus shown in FIG. 1A, parts of the frame being omitted.

FIGS. 1A-1C show a rotary cutting apparatus 2 comprising a frame 4 adapted to be attached to a not-shown basement. In the frame 4, a rotary cutter 6 and a rotary anvil 8 are arranged. In FIG. 1A, the rotary cutter 6 and the rotary anvil 8 are shown in a cutting relationship, whereas in FIG. 1B and FIG. 1D, they are shown in a separated relationship.

The rotary cutter 6 is provided with an elongated cutter shaft 10 and a cutter drum 12, the cutter drum 12 being coaxially arranged on the cutter shaft 10 about a rotation axis A-A. The shaft has an axial extension on each side of the cutter drum 12, where a cutter bearing housing 14 is provided, respectively. The cutter bearing housings 14 are each connected to the frame 4 by means of a fastening element 16, such as a screw. The cutter shaft 10 is preferably made of steel and is adapted to connected to a not shown rotatable power source.

The cutter drum 12 is provided with a pair of annular support rings 17 and a pair of annular cutter sleeves 18*a*, 18*b* each provided with cutting members 20 for cutting articles from a web (see FIG. 6.). The support rings 17 may be separate parts. Alternatively, one of the support rings may be an integrated part of the cutter sleeve 18*a* and the other support ring an integrated part of the other cutter sleeve 18*b*. An intermediate annular sleeve 22 without cutting edges is provided between the annular cutter regions 18*a*, 18*b*, the intermediate sleeve 22 and the cutter sleeve 18*a*, 18*b* being coaxially arranged in relation to the axis A-A. Alternatively, the support rings 17, the annular cutting sleeves 18*a*, 18*b* and the intermediate annular sleeve 22 may be made of one single piece, forming a an integrated annular sleeve, the axial extension of which corresponding to that of the cutter drum 12.

The support rings 17, the annular cutter sleeves 18*a*, 18*b* and/or the intermediate piece may be made of steel, but are preferably made of a cemented carbide. They are press-fit onto a portion of the cutter shaft 10 having an enlarged diameter, altogether constituting said cutter drum 12.

The rotary anvil 8 is provided with an elongated anvil shaft 24 and an anvil drum 26, the anvil drum 26 being coaxially arranged on the anvil shaft 24 about a rotation axis B-B.

The anvil drum 26 comprises a pair of support rings 27 and three coaxially arranged annular anvil sleeves 28*a*, 28*b*, 28*c*, each having a rotational symmetrical anvil surface 29, coaxial to the axis B-B.

The support rings 27 may be separate parts. Alternatively, one of the support rings may be an integrated part of the peripheral anvil sleeve 28*a* and the other support ring an integrated part of the other peripheral anvil sleeve 28*c*. The peripheral anvil sleeves 28*a*, 28*c* are arranged on either sides of the anvil sleeve 28*b*. Together, they are coaxially arranged in relation to the rotational axis B-B and are preferably made of steel. Alternatively, the peripheral sleeves 28*a*, 28*c*, the intermediate sleeve 28*b* and the support rings 27 are made as a single piece, forming an integrated annular sleeve, the axial extension of which corresponding to that of the cutter drum anvil drum 26.

They are press-fit onto a portion of the anvil shaft 24 having an enlarged diameter, altogether constituting said anvil drum 26 (see also FIG. 4).

The support rings 27 are adapted to bear against the support rings 17 of the cutter drum during the cutting operation.

The anvil shaft 24 is arranged vertically above the cutter shaft 10 in such a way that the axis B-B is parallel to and is in the same vertical plane as the axis A-A.

An anvil bearing housing 30 is arranged on either sides of the anvil drum 26 and connected to an intermediate piece 32 (best shown in FIG. 1B). The intermediate piece 32 is in sliding relationship with a pair of C-shaped parts 34 of the frame 4, having an upper shank 34*a*, a lower shank 34*b* and an interconnecting portion 34*c*, via four guide members 36. The C-shaped part 34 is provided with an opening 37 for allowing access to the anvil bearing housing 30, two of the guide members 36 being arranged between the upper and lower shanks 34*a*, 34*b* and on opposite sides of one of the anvil bearing housings 30, while two further guide members are arranged between the upper and lower shanks 34*a*, 34*b* and on opposite sides of the other anvil bearing housing 30.

A pair of pneumatic cylinders 38 are each provided with a piston 40 (best shown in FIG. 1C) and a hose 42 for connection to a not shown pneumatic source. During operation, the piston will press the intermediate piece 32 including the anvil bearing housings 30 and thus also the anvil support ring 27 as well as the surface of the annular anvil rings 28*a*, 28*c* towards and against the support rings 17 and the cutting members 20 of the cutter drum, respectively.

A helical spring 44 is provided about each guide member 36 and acting on the intermediate piece 32 and the 34*b* lower shank of the C-shaped part 34. Hereby, the anvil drum 26 is prevented from colliding with the cutter drum 12 when applying pressure by means of the pneumatic cylinders or after passage of a foreign body, in turn avoiding damages of the knife member 20 and/or the anvil surface 29. The springs 44 also counter-balance the weight of the rotary anvil 8, such that a minimum pressure is required for the anvil surface 29 to come into contact with the cutting members 20 during use.

Between the intermediate piece 32 on each side of the anvil drum 26, a passive damper 46 in the form of a mass damper 47 comprising an elongated cylinder 48 is arranged parallel to the rotational axis B-B of the anvil drum 26. The cylinder 48 is connected to the intermediate pieces 32 by brackets 49, respectively. The elongated cylinder 48 comprises a movable damping body 50, tunable to a predetermined frequency range.

A further passive damper 46 in the form of the members 52 shown as circular-cylindrical tubes and made of any elastomeric material having a high damping coefficient, such as polyurethane (PU), rubber, silicone or neoprene. Each elastomeric member is arranged about one of the helical springs 44 and thus also about one of the guide members 36, as can be understood by the cross-section-in-part of FIG. 1B.

The elastomeric members 52 also adds to the stiffness of the rotary cutting apparatus 2, adding to the stability of thereof.

The elastomeric members 52 will isolate the anvil drum 26 from the vibrations transferred via the frame from the web or the source of power.

As already mentioned above, FIG. 1A shows how the rotary cutter 6 and the rotary anvil 8 come into a cutting relationship by allowing the pneumatic cylinders 38 to press against an upper contact surface 54 of the intermediate piece and in turn on the rotary anvil.

In FIGS. 1B. and 1C the pneumatic cylinders 38 have been de-activated, such that no pressure is any longer exerted by them downwardly on the intermediate pieces 32. Instead, the springs 44 exert a pressure upwardly on the lower shank 34*b* of the C-shaped portion 34 and on a lower contact surface 56 of the intermediate piece 32. The springs 44 will thus cause the rotary anvil 8 to move vertically upwards and away from the rotary cutter 6 to the above mentioned non-cutting, in this case lifted position.

When the anvil drum 26 is in a cutting relationship with the cutter drum 12, the elastomeric members 52 (see FIG. 1B) will each contact the lower shank 34*b* of the C-shaped parts 34 as well as the lower contact surface 56 of the intermediate piece 32. However, when the pneumatic cylinders 38 are inactivated, the springs 44 will press the intermediate piece 32 vertically upwards such that the upper contact surface 54 of the intermediate piece 32 will rest against the upper shank 34*a* of the C-shaped part 34. There will be a free space between the elastomeric member 52 and the lower contact surface 56 of the intermediate piece, since the elastomeric member 52 has a shorter axial extension than the spring 44.

In order to lower the centre of gravity, the intermediate piece 32 is made of a light material, such as aluminium. Also other parts arranged at a high point influencing the centre of gravity should be made of a light material, such that it can be lowered.

In FIG. 1C is also shown a guide roller 60 for a web 68 (see also FIG. 6), as well as moisturising rollers 62 for applying oil on the cutting members 20.

FIG. 2 shows a second embodiment of the invention, according to which a pair of passive dampers 46 in the form of elongated cylinders 48 are connected to each intermediate piece 32 by retainers 61. The elongation of the cylinders 48 are in this case across the rotational axis B-B of said anvil.

Also in this case, the elongated cylinders 48 are mass dampers 47. No further passive damper in the form of circular-cylindrical rings is provided.

As described above, the springs 44 act in cooperation with the pneumatic cylinders 38. As can be seen in FIG. 2, the anvil drum 26 is in its non-cutting, also in this case lifted position.

Depending on the vibration damping requirements, the mass dampers 47 of FIG. 2 could be combined with further passive dampers in the form of elastomeric rings 44 as shown in FIGS. 1A-1C.

Figure 3:
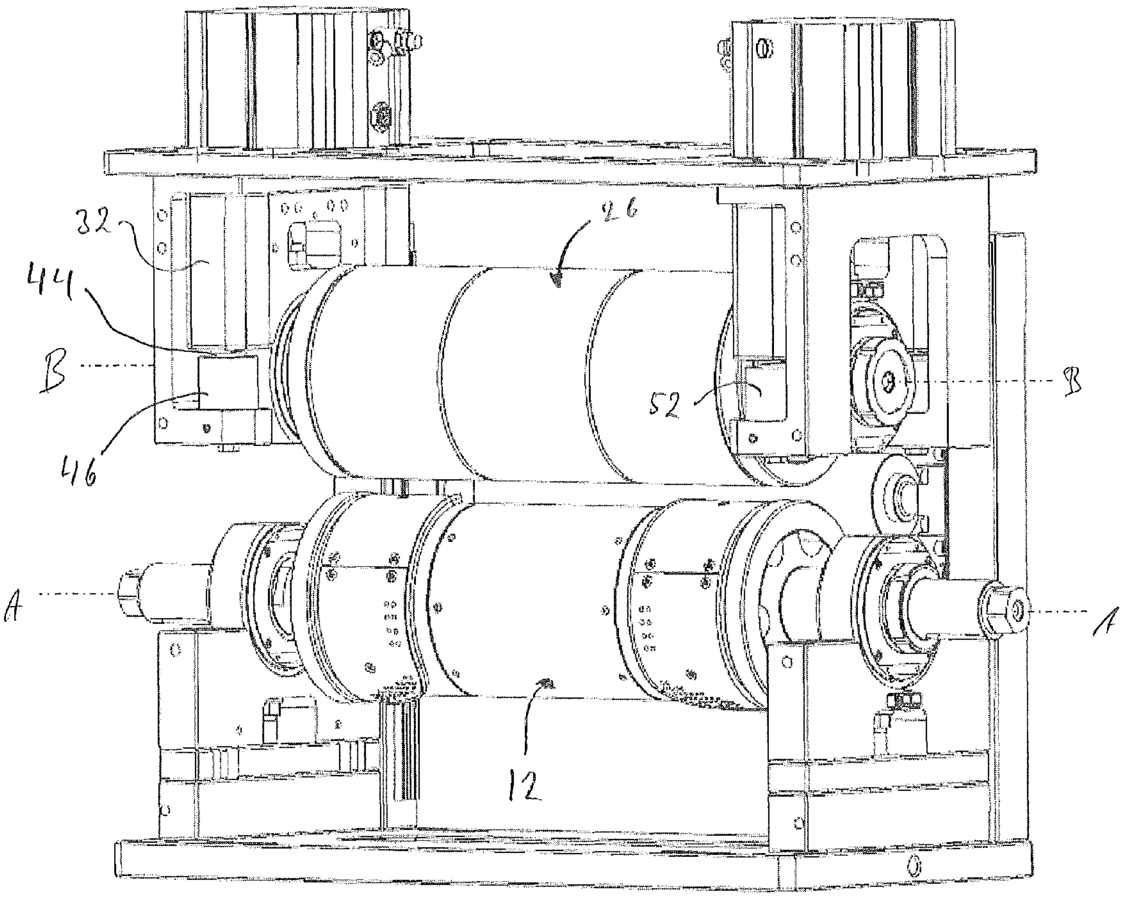
FIG. 3 is a front perspective view of a rotary cutting apparatus according to a further aspect of the invention.

FIG. 3 shows a third embodiment, according to which passive dampers in the form of elastomeric rings are provided about the springs. The springs are visible, sine the anvil drum 26 is in its non-cutting, also in this case lifted position. No mass damper is provided.

FIG. 4 shows the rotary anvil 26 of FIGS. 1A-1C, 2 and 3 with its anvil shaft 24 and anvil sleeves 28*a*, 28*b*, 28*c* (the anvil sleeve 28*a* being omitted in the figure for facilitating understanding).

In order to reduce vibrations in the rotary cutting apparatus 38, it is preferred that the centre of gravity of the rotary cutting apparatus 2 is as low as possible.

As can be seen in the figure, the anvil shaft has a larger radial extension than that of the opposite ends, where the bearing housings are to be arranged. Consequently, in order to reduce weight of the rotary anvil mounted above the rotary cutter 6, radial blind holes 64 are provided in the anvil shaft 24 under the anvil sleeves 28*a*, 28*c*. For the same purpose, a ring-shaped groove 66 is provided underneath the anvil sleeve 28*b*, hereby reducing of the diameter of the anvil shaft 24. It should be noted that the radial blind holes 64 and/or the groove should be large enough to create a substantial weight reduction.

It should be noted that the centre of gravity may be lowered by choice of material of relatively heavy parts, e.g. of the intermediate part 32 shown in FIGS. 1A-1C and 2-3, to aluminium, carbon fibre or the like, instead of steel.

FIG. 5 shows a fourth embodiment, according to which the rotary cutter 6 with knife members 20 is arranged vertically above the rotary anvil 8. As described above, the anvil shaft 24 is connected via the anvil bearing housings 30 to the intermediate piece 32, which is movably arranged in relation to guide members 36. The pneumatic cylinders 38 are arranged below the rotary anvil 8 and thus press the anvil drum 26 upwards towards and against the cutter drum 12 to a cutting position. When the pneumatic cylinders 38 are inactivated, the springs will press the anvil drum 26 downwards to a non-cutting, in this case lowered position (not shown).

In order to lower the centre of gravity, the extension of the cutter shaft 10 may be reduced such that it does not extend outside one of the cutter bearing housing 14, the other extension being connected to a not shown power source.

In this embodiment, the cutter shaft 10 may instead of the anvil shaft 24 be provided with the weight reduction as explained in connection with FIG. 4, since this will lower the centre of gravity of the rotary cutting apparatus 2. Preferably, the intermediate piece 32 should in this case be made of steel, since the low position of it would in itself lower the centre of gravity.

In FIG. 6A, the anvil drum 26 is arranged above the cutter drum 12, whereas in FIG. 6B, the cutter drum is arranged above the anvil drum. FIGS. 6A and 6B show schematically how a web 68 is conveyed via the nip 69 between the cutter drum 12 and the anvil drum 26, being in a cutting relationship, and how the cut articles are directed in another direction than what is the case for the residue of the web, and depending on which one of the drums is arranged on top of the other.

FIG. 7 shows schematically the principle of the mass damper 47 shown in FIGS. 1B and 2.

In the mass damper 47 of FIG. 7, an elongated circular cylindrical housing 48 is concentrically provided with a rod or a tubing 70. The housing is 48 connected to the rod or tubing 70 by means of a bushing 72, preferably made of an elastomeric material, such that disassembly is allowed. A space 74 is defined between the housing and the rod. In the space, there is provided a damping body 50 made of e.g. plastic, steel or led. The damping body 50 is substantially prevented from moving in an axial direction by the bushings 72. The damping body 50 is however allowed to move in a radial direction in relation to said rod or tubing 70 inside the housing 48. The remaining space is filled with a fluid, such as air, water, oil or grease.

The mass damper 50 may instead be constituted by a liquid of high density, such as mercury. Alternatively, the damping body may be comprise granules of a suitable material such as led, optionally combined with a fluid (cf. above)

The mass damper 47 is possible to tune for different frequency ranges by choosing the length and diameter of the damping body 50 or the number of mass dampers 47, by choosing material of the damping body and by choosing what kind of gas or liquid is filled in the remaining space inside the housing.

Operation

A cutting operation as shown in FIGS. 6A and 6B has commenced.

Vibrations will be caused due to unbalances in the rotary cutter 6 and/or rotary anvil 8.

The web 68, is in itself relatively uneven as seen in a transverse direction of the web 68. This is because the contents of the web itself is a a combination of layers of varying thickness of i.a. fibres and super-gel. When passing the nip 69, a vertical movement of the rotary anvil 8 is caused. The larger the vertical movement, the larger the amplitude of the vibration. Due to the varying thickness of the web, continuous vibrations will be created when the web passes the nip 69.

In order to reduce the influence of continuous vibrations, it is important to lower the static and dynamic response and in particular to raise or lower the eigenfrequency by a proper design of the rotary cutting apparatus 2 including the frame 4, e.g. by choice of dimensions and material of different parts.

The springs 44 as such will add to the stiffness of the frame and consequently move the eigenfrequencies to a desired frequency.

Continuous vibrations will be possible to reduce by lowering the centre of gravity of the rotary cutting apparatus, e.g. as discussed in connection with FIG. 4. A foreign body inside or on the web causes the rotary anvil 8 to move vertically away from the cutting relationship with the rotary cutter even more. When the foreign body has passed the nip 69, the anvil drum 26 will be pressed towards the cutter drum 12 by the force of the pneumatic cylinders 38, possibly causing an impact. The springs 44 will reduce the return force of the impact, but they cannot reduce the vibrations due to the impact. For this reason, the passive dampers 46 as described above are provided.

The passive dampers 46 in the form of elastomeric members 52 will instantaneously reduce the force of the impact due to the circular cylindrical shape, and the choice of material will add to the reduction of the vibrations caused by the impact.

In the figures the elastic members have been shown as shorter than the axial elongation of the springs 44. They may however be longer than the helical springs.

The passive dampers 46 in the form of one or more mass dampers 47 will not be able to reduce the impact as such, but tests have proven that they will very efficiently and quickly reduce the vibrations caused by impacts.

The claims are not restricted to the embodiments shown above. Accordingly, depending on the vibration damping requirements, the mass dampers and of FIG. 2 could be combined with further dampers in the form of elastomeric rings as shown in FIGS. 1A-1C. For the same reason, the elastomeric rings shown in FIGS. 1A-1C may be omitted.

The housing 48 of the mass damper 47 may have any suitable shape, the cylinder having a cross-section being e.g. square, rectangular, triangular, polygonal or oval, the damping body 50 being adapted to the selected shape. Furthermore, the housing may have a non-cylindrical shape.

Likewise, even though the mass damper 47 of FIG. 5 has been shown as being solely of the cylindrical kind arranged parallel to the rotational axis B-B of the anvil drum, it could be replaced by the mass dampers 47 across the rotational axis B-B, as shown in FIG. 2, be exchanged to the elastometric rings as shown in FIG. 3 or be constituted by a combination of the dampers, depending on the damping requirements.

The pneumatic cylinders 38 may instead be hydraulic. The intermediate sleeve 22 shown in FIG. 1A may be constitutes by a further cutter sleeve. On the other hand, the cutter sleeves 18*a*, 18*b* and the intermediate sleeve 22 may be constituted by a single cutter sleeve.

The support rings 17 of the cutter drum 12 are described above as bearing against the support rings 27 of the anvil drum 26. It should however be noted that the anvil drum 26 may not be provided with support rings 27 at all, such that the support rings 17 of the cutter drum will bear directly against the anvil drum 26. Likewise, the cutter drum 12 may not be provided with the support rings 17 at all, such that the support rings of the anvil drum will bear directly against the cutter drum 12.

The springs 44 have been shown in the figures as helical springs. It should however be understood that any kind of resilient means having a spring action is meant.

The passive damper 46 in the form of four elastomeric members 52 may be made of any suitable damping material and may have any shape, such as cylindrical with a square shape or another polygonal shape. Likewise, the cylindrical shape may instead have the shape of a cone or a truncated cone or even spherical. It may be solid or hollow, depending on whether it is to be arranged about the spring 44 or beside it. The number is also not restricted to four, but could be two, three, or five or more, depending on the desired properties.

Even though it has been described above that the rotary anvil 8 is vertically movable in relation to the frame 4, it should be understood that the rotary cutter 6 may instead be vertically movable in relation to the frame. In that case, the cutter bearing housings 14 of the cutter shaft 10 will be connected to the intermediate piece 32, movably arranged at the guide members 36, while the anvil bearing housings 30 of the anvil shaft 24 will be connected to the frame 4. This relates to the both the upper (see FIGS. 1A-1C, 2 and 3) and the lower arrangement (see FIG. 5) of the intermediate piece 32.

In the embodiment of FIG. 5, where the anvil drum is arranged underneath the cutter drum, the anvil drum may be made in one piece together with the shaft.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

LIST OF REFERENCE NUMERALS

2 rotary cutting apparatus
4 frame
6 rotary cutter
8 rotary anvil
10 cutter shaft
12 cutter drum
14 cutter bearing housings
16 fastening element
17 support ring
18*a*, 18*b* annular cutter sleeve
20 cutting members
22 intermediate annular sleeve
24 anvil shaft
26 anvil drum
27 support rings
28*a*, 28*b*, 28*c* annular anvil sleeve
29 anvil surface
30 anvil bearing housing
32 intermediate piece
34 C-shaped part
34*a* upper shank
34*b* lower shank
34*c* interconnecting portion
36 guide member
37 opening
38 pneumatic cylinder
40 piston
42 hose
44 spring
46 passive damper
47 mass damper
48 elongated cylinder
49 bracket

50 damping body
52 elastomeric member
54 upper contact surface
56 lower contact surface
60 guide roller
61 retainer
62 moisturising roller
64 radial bore
66 groove
68 web
69 nip
70 rod or tubing
72 bushing
74 space

The invention claimed is:

1. A rotary cutting apparatus, comprising a frame;

a first rotary device comprising a first shaft concentrically arranged about a first rotational axis and a first drum concentrically arranged on said first shaft, said first shaft provided with a first pair of bearing housings arranged on either sides of said first drum; and a second rotary device comprising a second shaft concentrically arranged about a second rotational axis, and a second drum concentrically arranged on said shaft, said second shaft provided with a second pair of bearing housings arranged on either sides of said second drum, wherein said first and second rotary devices arranged in said frame in such a way that said first and second axes are substantially horizontal and substantially in the same vertical plane;

wherein said second shaft connected to the frame via said second pair of bearing housings, wherein said first shaft associated with said frame via said first pair of bearing housing, said first pair of bearing housings movable relative to said frame in a transverse direction to said first rotational axis by means of a force means, and wherein means is provided for passive vibration attenuation of at least said first shaft, said means being able to reduce vibrations due to impacts of the first drum in relation to said second drum.

2. A rotary cutting device according to claim 1, wherein said first pair of bearing housings are connected to an intermediate piece slidingly arranged in relation to said frame via at least one guide member, and wherein said force means comprises a pneumatic cylinder for pressing the first drum via said intermediate piece towards said second drum such that they come into a cutting relationship with one another, and at least one spring means for applying a force counter directed to that of the pneumatic cylinder, said means for vibration attenuation comprising at least one elastomeric member.

3. A rotary cutting device according to claim 2, wherein said spring means is a helical spring and said elastomeric member is hollow, said elastomeric member being arranged substantially coaxially to said helical spring.

4. A rotary cutting apparatus according to claim 3, wherein said frame is provided with a part having a substantial C-shaped cross-section on either sides of said first shaft, said part having an upper shank and a lower shank interconnected via an interconnecting portion, said guide member being arranged between said upper shank and said lower shank, said elastomeric member and said helical spring member being arranged substantially coaxially to said guide member.

5. A rotary cutting apparatus according to claim 4, wherein said elastomeric member has a circular cross-section.

6. A rotary cutting apparatus according to claim 1, wherein said first rotary device comprises a rotary anvil and wherein said second rotary device comprises a rotary cutter.

7. A rotary cutting apparatus according to claim 1, wherein the first and second rotary devices are a rotary cutter or a rotary anvil and wherein the first and second drums are an anvil drum or a cutter drum.

* * * * *